(12) United States Patent
Walton

(10) Patent No.: US 10,846,359 B2
(45) Date of Patent: Nov. 24, 2020

(54) SYSTEMS AND METHODS FOR CATEGORIZING WEB PAGES AND USING CATEGORIZED WEB PAGES

(71) Applicant: PREDICT INTERACTIVE, INC., Wichita, KS (US)

(72) Inventor: Timothy Walton, Wichita, KS (US)

(73) Assignee: PREDICT INTERACTIVE, INC., Wichita, KS (US)

( * ) Notice: Subject to any disclaimer, the term of this patent is extended or adjusted under 35 U.S.C. 154(b) by 351 days.

(21) Appl. No.: 15/811,792

(22) Filed: Nov. 14, 2017

(65) Prior Publication Data

US 2018/0137135 A1 May 17, 2018

Related U.S. Application Data

(60) Provisional application No. 62/423,388, filed on Nov. 17, 2016.

(51) Int. Cl.
*G06F 16/958* (2019.01)
*G06F 16/9535* (2019.01)
*G06F 16/955* (2019.01)
*G06F 16/35* (2019.01)
*G06F 16/954* (2019.01)

(52) U.S. Cl.
CPC .......... *G06F 16/958* (2019.01); *G06F 16/35* (2019.01); *G06F 16/954* (2019.01); *G06F 16/9535* (2019.01); *G06F 16/9566* (2019.01)

(58) Field of Classification Search
None
See application file for complete search history.

(56) References Cited

U.S. PATENT DOCUMENTS

| | | | |
|---|---|---|---|
| 7,130,850 B2 * | 10/2006 | Russell-Falla | G06F 16/9535 |
| 10,387,838 B2 * | 8/2019 | Bevis | H04L 67/306 |
| 2002/0038342 A1 * | 3/2002 | Ito | G06Q 30/02 709/203 |
| 2011/0320444 A1 * | 12/2011 | Yehaskel | G06Q 30/02 707/723 |
| 2012/0072940 A1 * | 3/2012 | Fuhrer | H04H 60/31 725/13 |

* cited by examiner

*Primary Examiner* — Wilson Lee
(74) *Attorney, Agent, or Firm* — Fisherbroyles LLP; Keats A. Quinalty

(57) ABSTRACT

Systems and methods for categorizing web pages and using categorized web pages are provided. The categorization involves using at least a master word list and one or more category word lists. The master word list tracks all words encountered by the system (except with the possible exception of natural words) and the category word lists includes words associated with a particular category. These lists can be initialized in a training phase and then the one or more category lists can be used to identify words in web pages matching words in one or more of the category lists. Based on this matching, as well as based on the master word list, a weight is generated for the web page, which is used to determine whether the web page belongs to a particular category.

17 Claims, 9 Drawing Sheets

| Master Word List 205 | Category Word List(s) 210 | Natural Word List 215 | Matched Word List(s) 220 |
|---|---|---|---|
| Word   Frequency | Word   Frequency | Word | Word |

Figure 2

| ID | URL | Finance | Sports | Crime | Weather | Politics | Categorization |
|---|---|---|---|---|---|---|---|
| 1 | http://www.newspaper.com/sports | 69 | 686 | 137 | 35 | 114 | Sports |
| 2 | http://www.localnews.com/business | 730 | 133 | 148 | 25 | 106 | Finance |
| 3 | http://www.nationalnews.com/news | 52 | 75 | 628 | 29 | 183 | Crime |
| 4 | http://washingtondc.com/capitalhill | 85 | 29 | 132 | 32 | 712 | Politics |

Figure 5B

SYSTEMS AND METHODS FOR CATEGORIZING WEB PAGES AND USING CATEGORIZED WEB PAGES

BACKGROUND OF THE INVENTION

Exemplary embodiments of the present invention are directed to systems and methods for categorizing web pages and using categorized web pages.

The Internet is composed of a large number of web pages making enormous amounts of information available to anyone with an Internet connection. This large volume can make it problematic to find relevant information on the Internet. Initial attempts to make information available involved hierarchical directories, such as the one popularized by Yahoo. This required a large amount of work by people to review new web pages and assign them to categories within the hierarchical directory.

Search engines quickly overtook hierarchical directories due to the ever-increasing amount of available web pages and the cost of maintaining a large staff to categorize web pages. Search engines operate by matching search terms against a database of web pages. The manner in which web page matches are identified and ranked in the search results can vary from one search engine to the next.

Although search engines are able to more efficiently deliver web pages compared to hierarchical directories, search engines—unlike human organized hierarchical directories—do not attempt to understand the content of the matched web pages. Thus, for example, early search engines were often tricked into identifying web pages are being relevant based on hidden, embedded web page tags despite the human-readable content not being particularly relevant to the search terms. A page rank algorithm, which is employed by Google, attempts to address search result manipulation by ranking web pages by relative importance based on incoming and outgoing links to each web page. Although it provides more relevant search results, the page rank algorithm—like algorithms used by other search engines, does not attempt to understand the content of the web page.

SUMMARY OF THE INVENTION

The hierarchical directory techniques described above are useful for categorizing web pages but require significant human resources and although the search engines using term matching described above are automated they do not attempt to understand the content of the web page. Accordingly, it would be desirable to categorize web pages (i.e., understand the content of the web page) without requiring significant human resources. This categorization has a number of uses, including the ability to use the categorized web pages to generate automated content, such as a news article, generate lists for web widgets, select relevant advertisements for display on the categorized web page, as well as to create a hierarchical web page directory.

According to an exemplary embodiment, a method according to the invention involves a processor receiving a master word list, a category word list, and a natural word list, and a web page. The processor collects human-readable words on the web page. For each of the collected human-readable words, the processor discards collected human-readable words matching words in the natural word list, adds each of the collected human-readable words that are not in the master word list to the master word list, and increments a count in the master word list for each of the collected human-readable words that are in the master word list. The processor generates a weight for the received web page based on the collected human-readable words and determines whether the web page is assigned to a category of the category word list based on the generated weight. The processor outputs the web page as a categorized web page when it is determined the web page is assigned to a category of the category word list.

According to another exemplary embodiment, a method according to the invention involves a processor receiving a master word list, a plurality of category word lists, and a natural word list, and a web page. The processor collects human-readable words on the web page. For each of the collected human-readable words, the processor discards collected human-readable words matching words in the natural word list, adds each of the collected human-readable words that are not in the master word list to the master word list, and increments a count in the master word list for each of the collected human-readable words that are in the master word list. The processor generates a plurality of category weights for the received web page based on the collected human-readable words and determines whether the web page is assigned to a category of one of the plurality of the category word list based on the generated category weights. The processor outputs the web page as a categorized web page when it is determined the web page is assigned to the category of one of the plurality of the category word lists.

According to yet another exemplary embodiment, a method according to the invention involves a processor collecting human-readable words on a web page and generating a weight for the received web page by accumulating values associated with each of the human-readable words on the web page that match words in a category word list. The processor determines that the web page is assigned to a category of the category word list based on the generated weight and automatically generates human-readable content using the web page as a categorized web page when it is determined the web page is assigned to a category of the category word list.

BRIEF DESCRIPTION OF THE DRAWING FIGURES

FIG. 2 is a block diagram of exemplary lists in accordance with the present invention;

FIG. 5B is a block diagram of an exemplary categorized web page list in accordance with the present invention;

DETAILED DESCRIPTION

Figure 1:
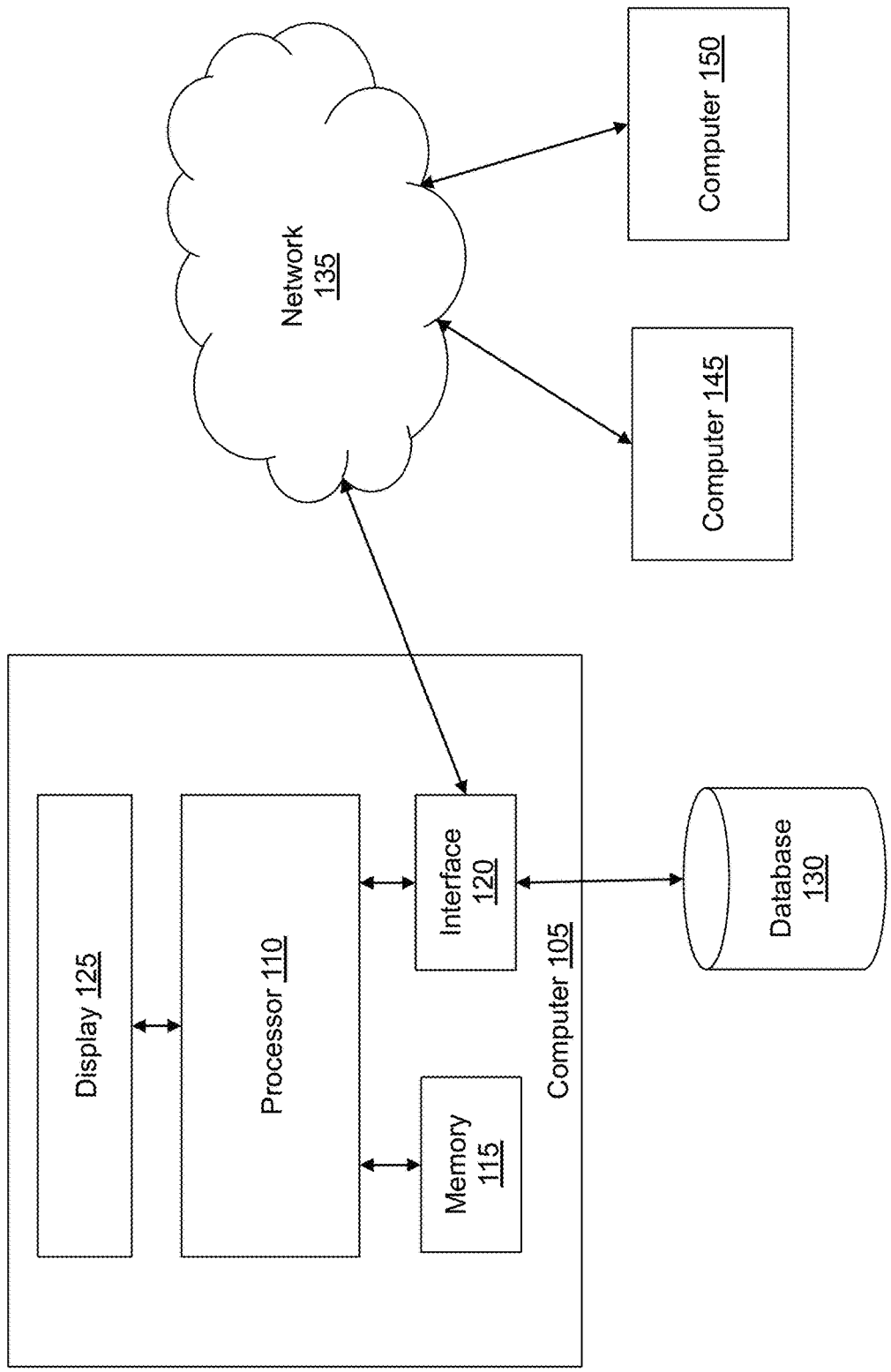
FIG. 1 is a block diagram of an exemplary system in accordance with the present invention.

FIG. 1 is a block diagram of an exemplary system in accordance with the present invention. The system includes a computer 105 coupled to one or more other computers 145 and 150 via a network 135, such as the Internet. As will be described in more detail below, computer 105 performs the disclosed methods for categorizing web pages and using the categorized web pages in accordance with the present invention. Computers 145 and 150 can be servers hosting web pages and/or one of these computers can be an end-user computer that is provided with the results of the web page categorization. Computers 105, 145, and 150 can be any type of computer, including desktop computers, laptop computers, tablets, smart phones, etc.

Computer 105 includes one or more interfaces 120 for communicating with Internet servers, which can be any type of wireless and/or wired interface. Interface 120 is coupled to processor 110, which is coupled to one or more memories 115 in order to, among other things, perform the disclosed methods. Processor 110 can be any type of processor, including a microprocessor, field programmable gate array (FPGA), application specific integrated circuit (ASIC), and/or the like.

Processor 110 is also coupled to one or more displays 125. The display 125 can take the form of any type of display.

Memory 115 can include any type of memory, including random access memory (RAM), read-only memory (ROM), a solid state hard drive (SSD), a spinning hard drive, and/or the like. Further, some of the memory 115 can be external to the computer 105. For example, computer 105 can be coupled to one or more databases 130 via interface 120. Memory 115 can store, among other things, computer-readable code for performing the methods of the present invention. For example, memory 115 can include a non-transitory computer readable medium containing such code.

The present invention categorizes web pages in connection with one or more word lists that are stored in memory 115 and/or database 130. Exemplary word lists are illustrated in FIG. 2, which include a master word list 205, one or more category word lists 210, natural word list 215, and one or more matched word lists 220. These word lists should be understood to include any computer-readable form of a list, including a spreadsheet, word processing document, and/or database. Alternatively and/or additionally, these lists can be nothing more than words stored in memory in any fashion allowing the processor 110 to uniquely associate the words with one or more of these lists.

Master word list 205 maintains a list of all of the words encountered while performing the methods of the present invention (except for the words in the natural word list 215) regardless of the category of the words. As illustrated in FIG. 2, the master word list also tracks the frequency of occurrence of the words in the list.

Category word lists 210 are lists of words associated with a particular category used for categorizing web pages. Thus, for example, a category word list for sports could include words such as baseball, football, soccer, quarterback, center, etc.; and a category word list for politics can include words such as politician, congressman, congresswoman, senator, governor, president, etc. These particular category word lists are merely exemplary and the present invention can be employed with any type of category. Furthermore, the categories can be more granular than the examples above so that one category word list can exist for football (having terms unique to football, such as quarterback, linebacker, field goal, etc.) and another word list exists for baseball (having terms unique to baseball, such as pitch, steal, strike-out, etc.).

It should be recognized that some words might appear in multiple category lists because certain words are used for different categories, such as pitch referring to a ball thrown by a baseball pitcher, as well as the field used for playing soccer. This commonality of words across categories can be addressed in a variety of ways. For example, words common across categories can be excluded from all category word lists to avoid false positives, such as a soccer article being categorized as a baseball article due to the use of the word pitch. The present invention, however, addresses this issue by a weighting scheme, which will be described in more detail below. Specifically, the present invention generates a cumulative weight based on the words matching words in a category word list so that even though a web page having the word pitch will match both a soccer and baseball category word list, the web page is unlikely to have other words that match both category word lists, thus avoiding false positive categorizations. Like the master word list 205, the category word list 210 tracks words and frequency of occurrence.

The natural word list 215 contains common words that likely do not provide any particular information useful for categorizing a web page, such as "the", "a", "and", "his", "hers", etc. Thus, these words on the natural word list 215 will not be tracked in the master word list 205 or any of the category word lists 210. This reduces the overall memory requirement for implementing the present invention and also reduces the overall processing load of the present invention. It should be recognized that the types and number of words included in the natural word list 215 can vary depending upon implementation and can be adjusted to increase or reduce processing and memory requirements.

Matched word list 220 tracks words that appear on a web page matching words in a corresponding one of the category lists 210. Thus, if the method of the present invention is performed using category lists for football, baseball, and soccer, the present invention would have a corresponding matched word list 220 for each of the category lists.

Figure 3:
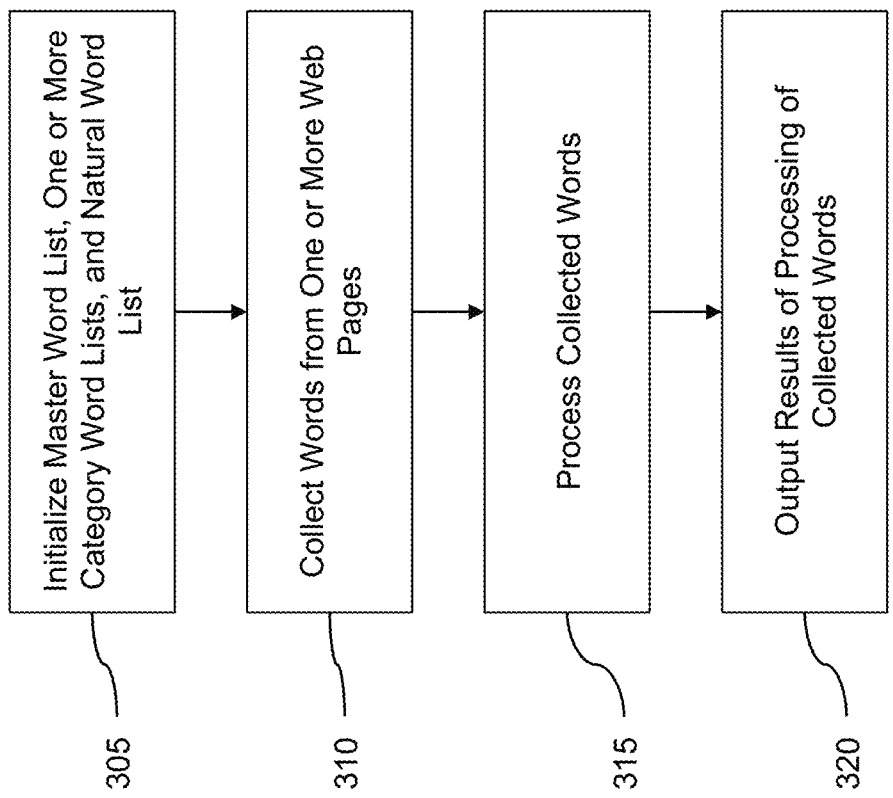
FIG. 3 is a flow diagram of an exemplary method for categorizing web pages and using the categorized web pages in accordance with the present invention.

FIG. 3 is a flow diagram of an exemplary method for categorizing web pages and using the categorized web pages in accordance with the present invention. The method begins with a training phase in which processor 110 initializes the master word list 205, one or more category lists 210, and natural word list 220 stored in memory 115 (step 305). This initialization of the master word list 205 and one or more category word lists 210 is described in more detail in connection with FIG. 4. The natural word list can be generated in any manner so that it includes words that are not likely to provide any or provides very little indication of the category in which the web page belongs.

Once these lists are initialized processor 110 collects words from the human-readable content on one or more web pages (step 310) and processes the collected words in order to categorize the one or more web pages (step 315). The term human-readable content refers to words that are visible to a human viewing the web page (as compared to words that appear only in the mark-up code and not displayed) and are words used by humans in a language (e.g., words that appear in a dictionary). The processing of the collected words is described in more detail in connection with FIGS. 5A and 6. Finally, processor 110 outputs the results of the processing of the collected words (step 320), which will be described in more detail in connection with FIGS. 7A and 7B.

Figure 4:
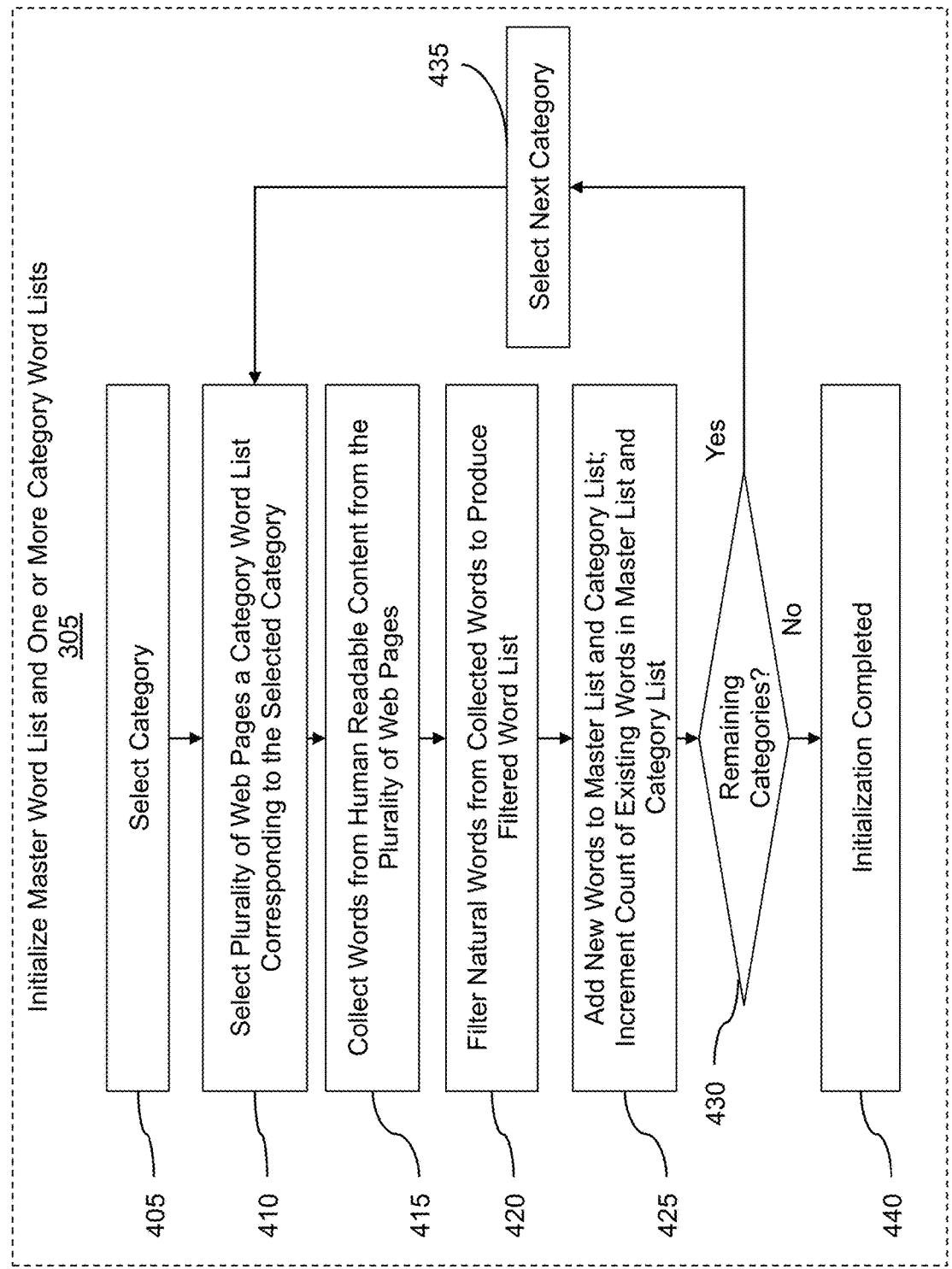
FIG. 4 is a flow diagram of an exemplary method for generating lists in accordance with exemplary embodiments of the present invention.

FIG. 4 is a flow diagram of an exemplary method for initializing the master word list and one or more category word lists. Initially, processor 110 selects a category from a number of categories (step 405) and selects a plurality of web pages and a category word list 210 corresponding to the selected category (step 410). Because the method of FIG. 4 is intended to train the categorization system of the present invention, the selected web pages should be have some relevance to the particular category being trained.

Processor 110 then collects all of the words from human-readable content from each of the plurality of web pages (step 415) and filters words appearing in the natural word list 215 from the collected words to produce a filtered word list (step 420). Because web pages are stored and delivered in a coded form, i.e., coded in hypertext markup language (HTML), the web pages will include a lot of non-human readable content that is not relevant to the categorization of the present invention. Accordingly, processor 110 uses known HTML tags to identify human-readable content. Words that do not appear in the master word list 205 are added to this list, words that do not appear in the category word list 210 are added to this list, words that appear in either or both of the master word list 205 and category word list 210 will have their frequency count incremented in the corresponding list (step 425). The present invention can alternatively employ a threshold for adding to the category list so that a word is only added if the word occurs more than a predetermined number of times in the human-readable content of a particular web page.

Processor 110 then determines whether there are any remaining categories for the list initialization (step 430). When there are remaining categories ("Yes" path out of decision step 430), processor 110 selects the next category (step 435) and repeats steps 410-425 for the selected category. When there are no remaining categories ("No" path out of decision step 430), then the initialization is completed (step 440) and the method exits the training phase and enters the categorization stage according to steps 310-320 of FIG. 3.

It should be recognized that the method of FIG. 4 could be performed so that words are collected from a single web page at a time. In this case the method would include an inner return loop from step 425 back to step 415 so that the next web page for the category being trained is selected.

Figure 5A:
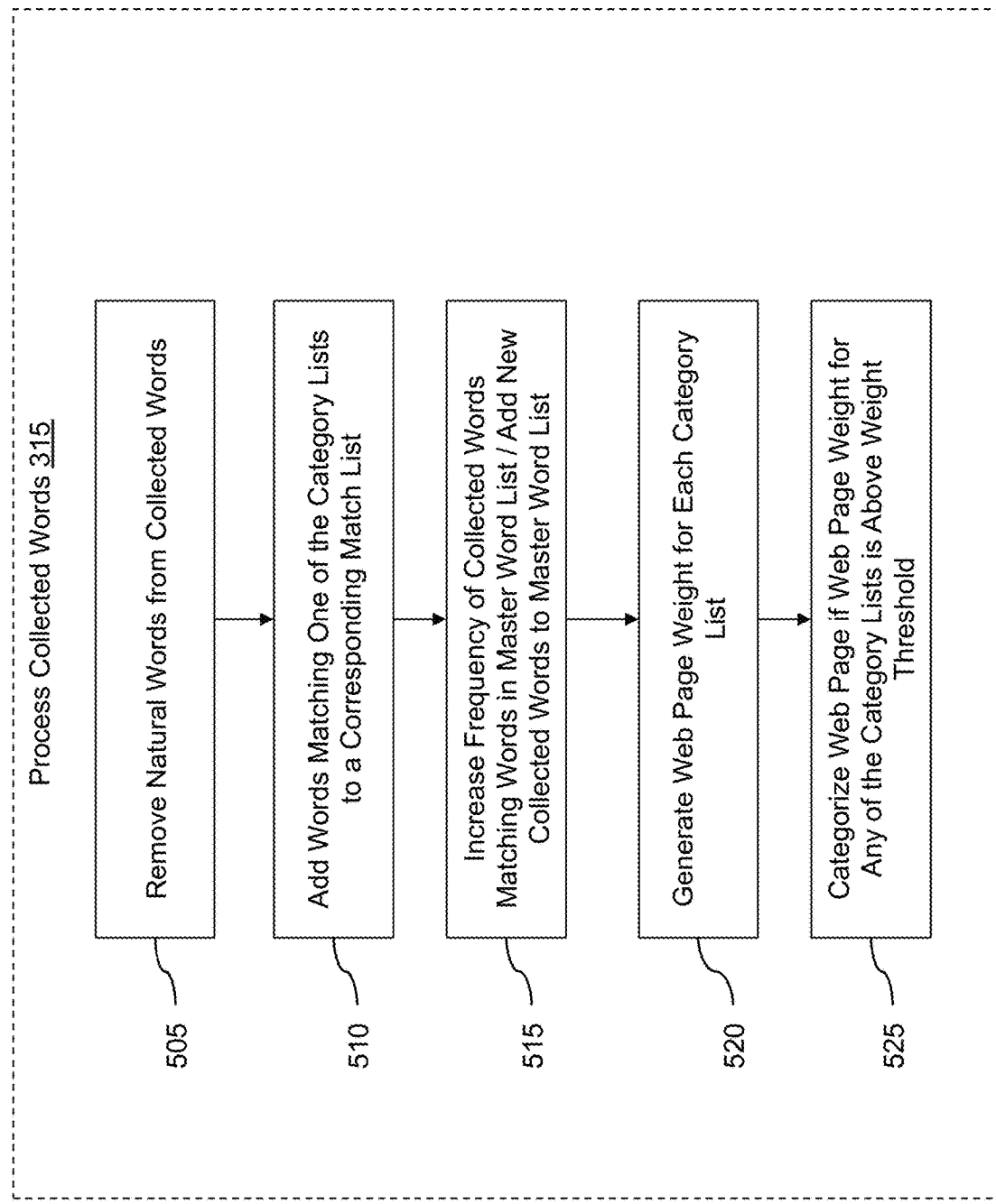
FIG. 5A is a flow diagram of an exemplary method for processing words collected from a webpage in accordance with the present invention.

The processing of the collected words during the categorizing phase in step 315 will now be described in connection with the flow diagram illustrated in FIG. 5A. Initially, processor 110 removes natural words from the collected words (step 505). Processor 110 then adds words matching one of the category lists to a corresponding match list (step 510). Thus, if one of the collected words matched a sports category list, a corresponding matched word list 220 is maintained for matching words. Similarly, if one of the collected words matched a politics category list a corresponding matched word list 220 is maintained for matching words. This allows for web pages ultimately falling into different categories to be processed at the same time, while tracking the commonality of the collected word with one or more category lists. Thus, for example, if the web page included the word "pitch", which also appears in a soccer category list and a baseball category list, this word would be added to a match list for the soccer category and a match list for the baseball category. The addition of words to a corresponding matched word list can either occur upon a single occurrence of the word in the human-readable content or a threshold can be employed so that more than a predetermined number of occurrences is required before adding a word to the corresponding matched word list.

For each collected word processor 110 checks to see whether or not the word exists in the master word list 205. If the word exists in the master word list 205 the corresponding word frequency count is increased and if the word does not exist it is added to the master word list 205 (step 515). The word frequency in the master word list is used for generating weightings and therefore as will be appreciated from the discussion of weighting below, tracking all collected words allows for more accurate categorization.

Processor 110 then generates a web page weight for each category list (step 520), which will be detailed below in connection with FIG. 6. Processor 110 categorizes a web page if the web page weight for any of the category lists is above a weight threshold and stores the categorized web page in a categorized web page list (step 525). FIG. 5B illustrates an exemplary categorized web page list in accordance with the present invention, which can be stored in a database for quick reference. As illustrated in FIG. 5B, the categorized web page list stores, for each categorized web page, an identification number, the web page URL, weights calculated for each of a number categories, and a categorization of a web page. Because the present invention processes each web page against a number of category word lists 210 and generates one or more corresponding matched word lists 220 to generate a weight for each category, the categorized web page list stores the corresponding weight calculated for each category.

Figure 6:
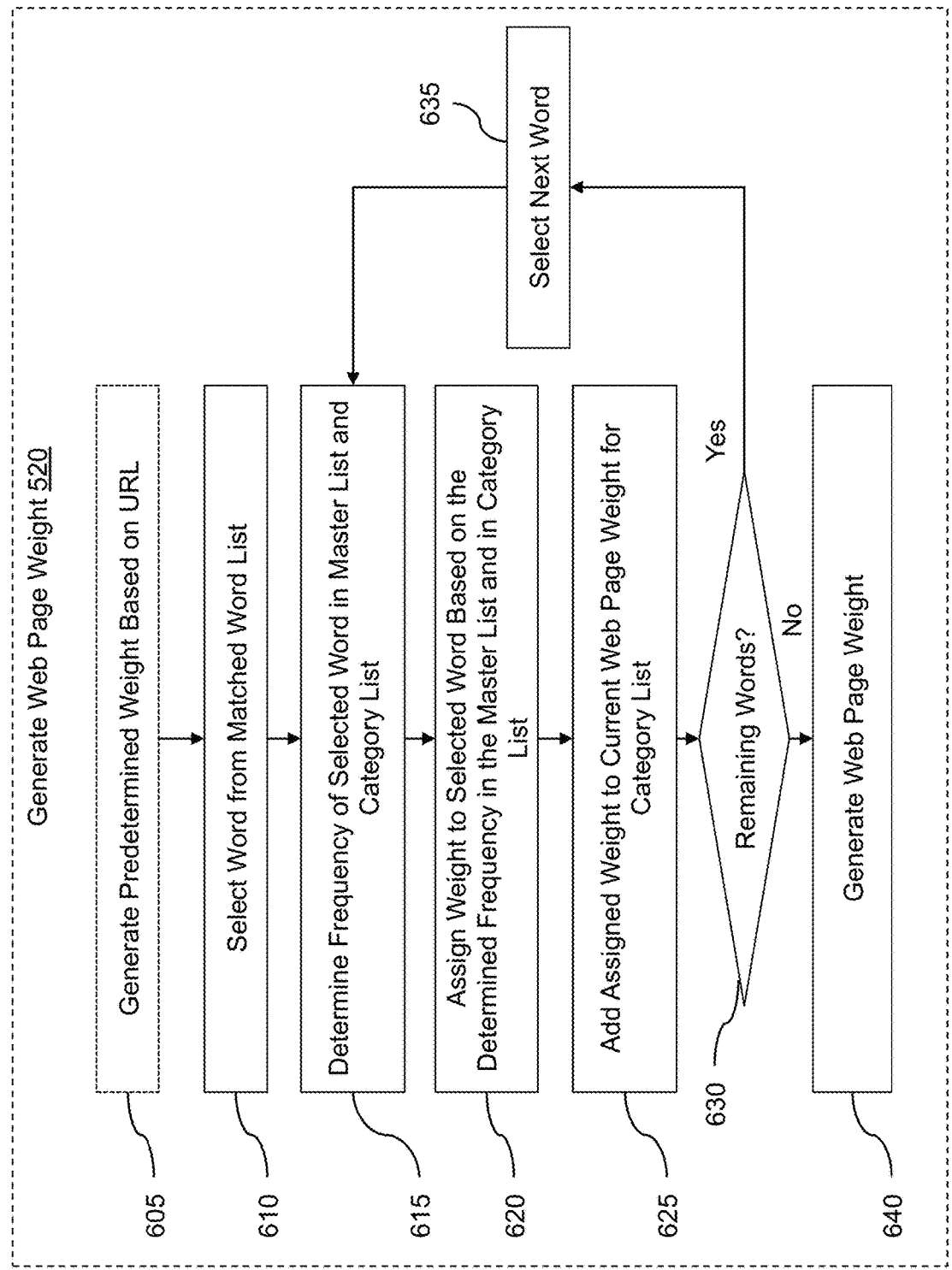
FIG. 6 is a flow diagram of an exemplary method for generating webpage weights in accordance with the present invention.

FIG. 6 is a flow diagram of an exemplary method for generating webpage weights in accordance with the present invention. This method is performed for each matched word list 220 using the corresponding category word list 210. Again, this may occur due to similar terms appearing in different category lists, such as pitch appearing in both soccer and baseball category word lists. If there are more than one matched word lists 220, the method illustrated in FIG. 6 can be performed for the matched word lists 220 serially or in parallel. Further, when there is only one matched word list 220, the method would be performed on that single matched word list.

Initially, processor can generate a predetermined weight based on the URL itself (step 605). For example, the URL itself may include a word in one of the category lists, and therefore the predetermined weight increases the likelihood that the particular page is assigned to a relevant category. For example, if a portion of the URL included "Johnson_Pitches_Perfect_Game", the word "pitches" would match a baseball category. This is particularly useful for increasing the likelihood of categorization because when URLs contain words the words are typically highly indicative of the type of content of the corresponding web page. The use of a predetermined weight based on the URL is illustrated in dashed lines to indicate that this is an optional step.

Next, processor 110 selects a word from the matched word list 220 and determines the frequency of the selected word in both the master word list 205 and the relevant category word list 210 (step 615) and then assigns a weight to the selected word based on the determined frequency in the master word list 205 and relevant category word list 210 (step 620). The weight can be based on a ratio of the frequency of occurrence of the term in the category word list 210 to the frequency of occurrence in the master word list 205. Because the master word list 205 tracks all words regardless of category, the more frequently that a word occurs in the master word list 205 the less likely that the word is uniquely associated with a particular category. Thus, the weighting using this ratio reduces the occurrence of false positive category matches.

Processor 110 then adds the assigned weight to the current weight for the web page (step 625), and thus the weight in this exemplary embodiment is a cumulative weight across of all of the human-readable content of the particular web page at issue. Processor 110 then determines whether there are any remaining words in the human-readable content on the page (step 630). When there are remaining words ("Yes" path out of decision step 630), then processor 110 selects the next word (step 635) in order to preform the processing necessary to calculate the web page weight (steps 615-625). When there are no remaining words ("No" path out of decision step 630), then the current cumulative web page weight is used as the generated web page weight (step 640). This cumulative web page weight is compared against the weight threshold in order to attempt to categorize the web page in step 525 of FIG. 5A. It should be recognized that only matched words are weighted, and thus a web page may contain many words that are not weighted due to lack of a category match, as well as fewer words that are weighted due to a category match.

Figure 7A:
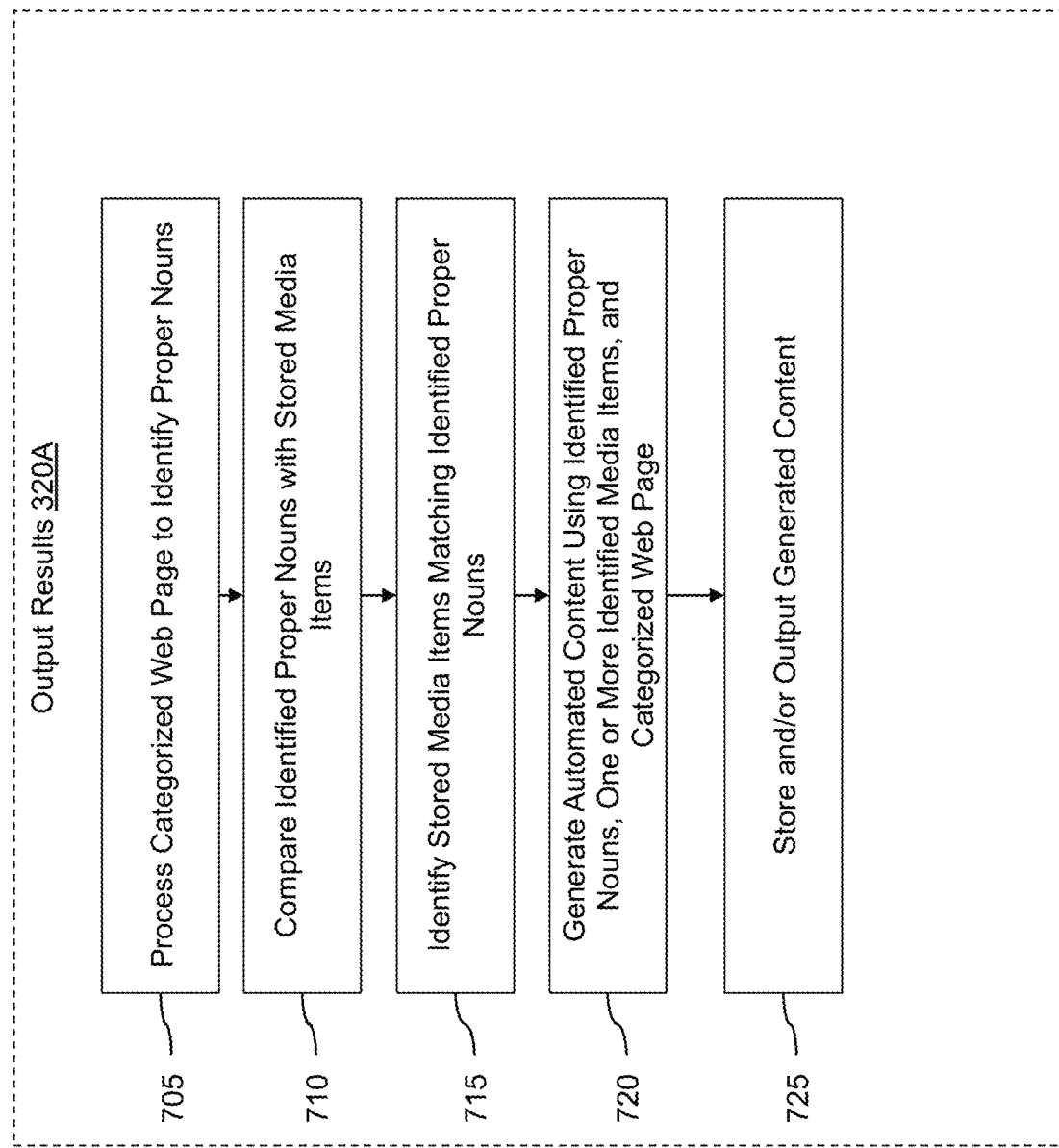
FIGS. 7A and 7B are flow diagrams of exemplary methods for outputting results in accordance with the present invention.
Figure 7B:
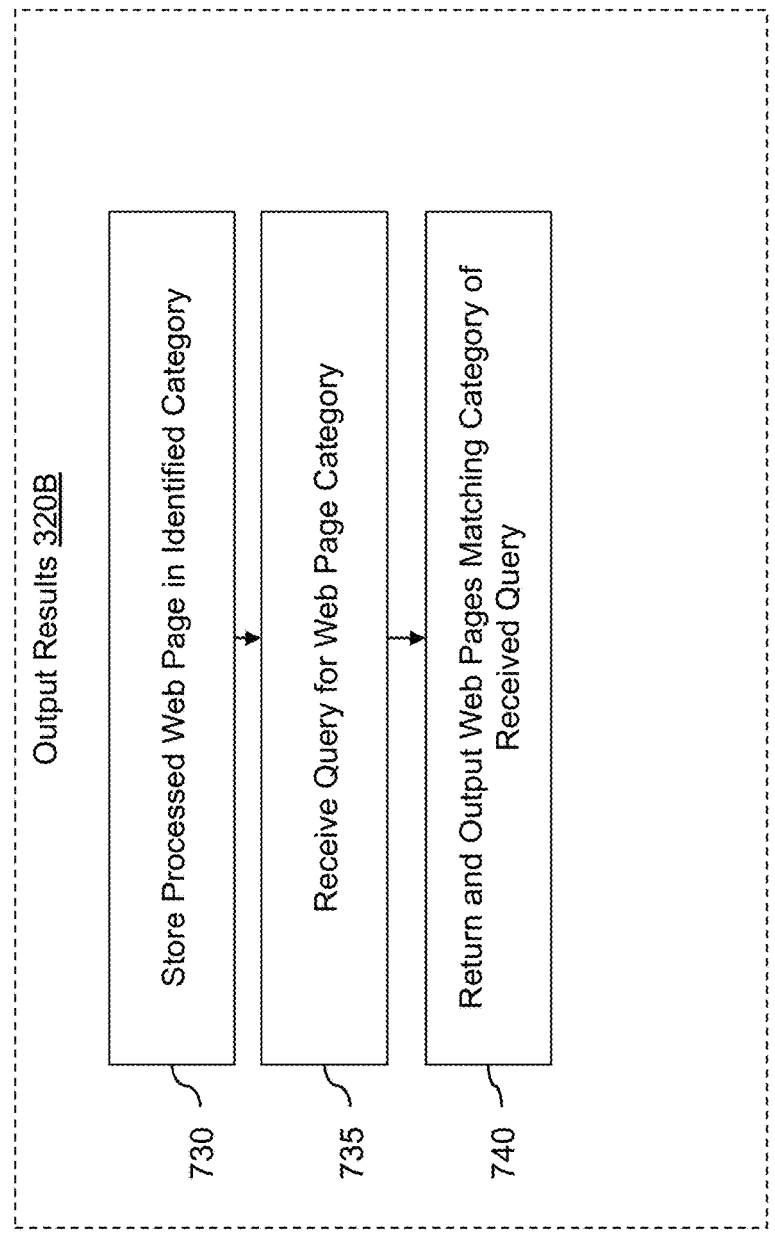

Categorization output can take a variety of different forms, two of which are illustrated in the flow diagrams of FIGS. 7A and 7B. The flow diagram of FIG. 7A outputs an artificial intelligence created article using the categorization results. Specifically, processor 110 processes the categorized web page to identify proper nouns (step 705) and compares the identified proper nouns with stored media items (step 710). It will be recognized that the use of capitalization in the English language can be used to identify proper nouns. If the present invention is implemented with other languages the specifics of the other language is considered in identifying proper nouns.

Processor 110 then identifies media items stored in memory 115 and/or database 130 matching the identified proper nouns (step 715). These media items can be any type of media items, including video, images, audio, etc. Thus, for example, if an identified proper noun is the name of a sports team the identified stored media could include an image of a logo of the sports team, images of one or more players on the team, video from a game played by the team, etc.

Automated content is then generated using the using the identified proper nouns, one or more identified media items, and the categorized web page (step 720) and the generated content can be stored and later accessed by computer 145 and/or 150 and/or can be output immediately on display 125 (step 725). The automated content can also be based on other information. Thus, for example, the automated content could be generated from more than one categorized web page in addition to the identified media items. Using a baseball category as an example, the automated content could describe a baseball game and the statistics of the game can be obtained from one categorized web page and information about one or more of the players (e.g., current season statistics) could be obtained from another categorized web page. Those skilled in the art will recognize there are many different artificial intelligence algorithms currently being used to generate automated content, any of which could be used in connection with the present invention.

FIG. 7B illustrates another method for outputting results, which could be used in addition or as an alternative to the method of FIG. 7A. Initially, processor 110 stores the processed web page in the identified category (step 730), which can be stored in memory 115 and/or database 130. When processor 110 receives a query for a web page category from, for example computer 145 and/or computer 150 (step 735), processor returns and outputs web pages matching the category of the received query (step 740). Thus, this method of outputting can provide a categorized list of web pages without requiring human intervention to categorize each web page.

Another method of output, which is not illustrated, can be to use the categorized web page, either alone or in combination with other categorized web pages, to generate list widgets, such as those disclosed in U.S. Provisional Application Nos. 62/372,821, 62/372,822, and 62/372,823, all of which were filed on Aug. 10, 2016, and all of which are herein expressly incorporated by reference. Further, the present invention can also use the web page categorization to display advertisements relevant to the categorized web page, as also disclosed in the afore-mentioned provisional applications.

Although exemplary embodiments have been described in connection with matching single words, the present invention can also be implemented by matching phrases (i.e., more than one word). For example, the words "perfect" and "game" individually do not provide an indication that the web page relates to baseball, whereas the phrase "perfect game" is a common baseball term denoting a game where a pitcher does not allow any hits or runs. In this case the various word lists could include both individual words, as well as phrases.

Although exemplary embodiments are described in connection with categorizing web pages, the present invention can also be employed to categorize any type of digital file in any format, including word processing documents, eXtensible Markup Language (XML) files, etc.

The following is exemplary JavaScript Object Notation (JSON) code for categorizing web pages using a sports category word list:

```
{
"weight": "500",
"frequency": "3",
"count": "1",
"handicap": "500",
"cross": "0",
"henable": "1",
"formula": "15",
"filter": "1",
"all": "0",
"results": "1",
"table": "sports_words",
"master": "master_words",
"natural": "natural_words",
"target": "sports",
"host": "localhost",
"user": "<removed>",
"password": "<removed>",
"base": "words",
"port": "3306",
"caps": [
  "sport",
  "sports",
  "basketball",
  "football",
  "march madness"
],
"learn": [
  "https:\/\/en.wikipedia.org\/wiki\/Glossary_of_American_football",
  "https:\/\/en.wikipedia.org\/wiki\/Glossary_of_basketball_terms",
  "https:\/\/en.wikipedia.org\/wiki\/Glossary_of_ice_hockey_terms",
  "https:\/\/en.wikipedia.org\/wiki\/Glossary_of_motorsport_terms",
  "https:\/\/en.wikipedia.org\/wiki\/Glossary_of_golf",
  "https:\/\/en.wikipedia.org\/wiki\/Glossary_of_tennis_terms",
  "https:\/\/en.wikipedia.org\/wiki\/Glossary_of_baseball"
],
"sql": "widgets\/configs\/sports.base.sql"
}
```

The following table defines the fields in the JSON code above:

| Parameter | Description | Default Value |
|---|---|---|
| weight | Minimum required combined weight to return a true response | 500 |
| frequency | Minimum required combined times a source word must be matched to be counted | 3 |
| count | Minimum required times a word must appear to be counted | 1 |
| handicap | Additional weight to be applied if a generic match is made during X mode | 500 |
| cross | instruct application to do cross comparison of learned URL | 0 |
| henable | Instruct application to use the handicap functionality | 1 |
| formula | Maximum computed weight for any word | 15 |
| filter | Instruct application to filter out natural words | 1 |
| all | Instruct application to log all words in the master_words table. Destination table can be overridden with the parameter 'override-all'=>'table_name' at run time | 0 |
| results | Store results of learn run to log file | 1 |
| table | Source word table to compare scraped words against | table_name |
| master | Master word table to log all words to | master_words |
| natural | Natural word table used for natural word lookups | natural_words |
| target | Target vertical type | (sports, crime, politics, finance, weather) |
| caps | Instruct the application to search for these words when applying handicap | array |
| learn | Array of URL's the application will learn base words for specified vertical. Used in combination with the 'override-all' parameter | Array |

The present invention is directed to addressing problems arising in the Internet, and thus the present invention is necessarily rooted in computer technology that solves problems unique to the Internet.

Although the present invention has been described above by means of embodiments with reference to the enclosed drawings, it is understood that various changes and developments can be implemented without leaving the scope of the present invention, as it is defined in the enclosed claims.

What is claimed is:

1. A method, comprising:
receiving, by a processor, a master word list, a category word list, and a natural word list;
receiving, by the processor, a web page;
collecting, by the processor, human-readable words on the web page;
for each of the collected human-readable words,
discarding collected human-readable words matching words in the natural word list;
adding each of the collected human-readable words that are not in the master word list to the master word list; and
incrementing a count in the master word list for each of the collected human-readable words that are in the master word list;
generating, by the processor, a weight for the received web page based on the collected human-readable words;
determining, by the processor, whether the web page is assigned to a category of the category word list based on the generated weight; and
outputting, by the processor, the web page as a categorized web page when it is determined the web page is assigned to a category of the category word list.

2. The method of claim 1, wherein the generated weight is a cumulative weight based on individual weights assigned to one or more of the collected human-readable words.

3. The method of claim 2, wherein the individual weights assigned to each of the one or more of the collected human-readable words is based on a ratio of a frequency of each of the collected human-readable words in the category word list to a frequency of each of the collected human-readable words in the master word list.

4. The method of claim 2, wherein individual weights are assigned to one or more of the collected human-readable words when there are more than a predetermined number of occurrences of individual ones of the one or more of the collected human-readable words.

5. The method of claim 1, further comprising: comparing a uniform resource locator (URL) of the web page with the category word list; and adjusting the weight for the received web page by a predetermined amount when the URL of the web page contains a word matching a word in the category word list.

6. The method of claim 1, wherein the master and category word lists are generated in a training phase, which comprises: receiving, by the processor, a plurality of web pages; for each of the plurality of web pages adding each of the collected human-readable words that are not in the master word list to the master word list; and incrementing a count in the master word list for each of the collected human-readable words that are in the master word list; adding each of the collected human-readable words that are not in the category word list to the category word list; and incrementing a count in the category word list for each of the collected human-readable words that are in the category word list.

7. The method of claim 6, wherein collected human-readable words that are not in the category list are not added to the category list and a count is not incremented when a collected human-readable word matches a word in the category list.

8. The method of claim 1, wherein the outputting of the categorized web page comprises:
processing the categorized web page to identify proper nouns; comparing the identified proper nouns with stored media items to identify at least one stored media item matching at least one of the identified proper nouns; and
automatically generating content using the at least one identified proper noun and the at least one stored media item.

9. The method of claim 8, wherein the automatically generated content is a news article.

10. The method of claim 8, wherein the automatically generated content is a web list widget or an advertisement.

11. A method, comprising:
  receiving, by a processor, a master word list, a plurality of category word lists, and a natural word list;
  receiving, by the processor, a web page;
  collecting, by the processor, human-readable words on the web page;
  for each of the collected human-readable words,
    discarding collected human-readable words matching words in the natural word list;
    adding each of the collected human-readable words that are not in the master word list to the master word list; and
    incrementing a count in the master word list for each of the collected human-readable words that are in the master word list;
  generating, by the processor, a plurality of category weights for the received web page based on the collected human-readable words;
  determining, by the processor, whether the web page is assigned to a category of one of the plurality the category word list based on the generated category weights; and
  outputting, by the processor, the web page as a categorized web page when it is determined the web page is assigned to the category of one of the plurality of the category word lists.

12. The method of claim 11, wherein the generated category weight is a cumulative weight based on individual weights assigned to one or more of the collected human-readable words.

13. The method of claim 12, wherein the individual weights assigned to each of the one or more of the collected human-readable words is based on a ratio of a frequency of each of the collected human-readable words in the category word list to a frequency of each of the collected human-readable words in the master word list.

14. A method, comprising:
  collecting, by a processor, human-readable words on a web page;
  generating, by the processor, a weight for the received web page by accumulating values associated with each of the human-readable words on the web page that match words in a category word list;
  determining, by the processor, that the web page is assigned to a category of the category word list based on the generated weight; and
  automatically generating human-readable content, by the processor, using the web page as a categorized web page when it is determined the web page is assigned to a category of the category word list;
  wherein the values associated with each of the human-readable words are based on a ratio of a frequency of occurrence in the category word list and a frequency of occurrence in a master word list.

15. The method of claim 14, wherein the automatic generation of human-readable content comprises:
  identifying, by the processor, proper nouns on the web page; and
  identifying, by the processor, media items matching the identified proper nouns, wherein the generated human-readable includes at least one of the identified media items.

16. The method of claim 15, wherein the identified media items include at least one of an image, audio, and video.

17. The method of claim 14, further comprising:
  comparing a uniform resource locator (URL) of the web page with the category word list; and
  adjusting the weight for the received web page by a predetermined amount when the URL of the web page contains a word matching a word in the category word list.

* * * * *